United States Patent

Smierciak et al.

[15] 3,636,244

[45] Jan. 18, 1972

[54] SEQUENTIAL DOT INTERLACED COLOR TELEVISION SYSTEM

[72] Inventors: Edward S. Smierciak; Thomas R. Butler, both of Fort Wayne, Ind.

[73] Assignee: International Telephone and Telegraph Corporation, Nutley, N.J.

[22] Filed: Feb. 3, 1969

[21] Appl. No.: 796,947

[52] U.S. Cl. ......................178/5.2 R, 178/5.4 R, 178/DIG. 3

[51] Int. Cl. ..........................................................H04n 9/36

[58] Field of Search ..................178/5.2, 5.4, 5.4 TE, 6.6 TP, 178/6.8, DIG. 3

[56] References Cited

UNITED STATES PATENTS

| | | | |
|---|---|---|---|
| 2,909,600 | 10/1959 | Becker | 178/DIG. 3 |
| 3,087,011 | 4/1963 | Boothroyd et al. | 178/5.2 |
| 3,128,338 | 4/1964 | Teacher et al. | 178/6.8 |
| 3,333,056 | 8/1967 | Pratt | 178/6.8 |
| 3,384,709 | 5/1968 | Quinlan | 178/6.8 |
| 3,499,980 | 3/1970 | Smierciak | 178/DIG. 3 |

*Primary Examiner*—Robert L. Griffin
*Assistant Examiner*—Richard P. Lange
*Attorney*—C. Cornell Remsen, Jr., Walter J. Baum, Percy P. Lantzy, Philip M. Bolton, Isidore Togut, Charles L. Johnson, Jr. and Hood, Gust, Irish and Lundy

[57] ABSTRACT

A sequential dot interlaced color television system having a color television camera with a plurality of output circuits respectively providing luminance and chrominance signals. A plurality of trains of recurrent sampling signals are generated equal in number to the number of camera output circuits, and a plurality of sampling gates are provided which couple each of the camera output circuits to a transmission facility in response to a different one of the trains of sampling signals so as to pass a train of sampled video signals from the respective output circuit to the transmission facility, the trains of sampling signals being respectively phase-displaced so that the sampled video signals are multiplexed in the transmission facility. A color television display tube is provided having a plurality of video signal input circuits equal in number to the camera output circuits for respectively receiving luminance and chrominance signals. Another plurality of trains of recurrent sampling signals are generated equal in number to the sampling signal trains generated at the transmitting station and respectively having the same frequencies and phase displacement, and another plurality of sampling gates are provided for coupling each of the display tube video signal input circuits to the transmission facility in response to a different one of the second trains of sampling signals thereby passing to the video signal input circuits trains of sampled video signals respectively corresponding to those passed by the sampling gates at the transmitting station. Thus, the color information-conveying signals provided by the camera tube are converted into sequential dot format and then multiplexed for application to the transmission facility. At the receiver, the multiplexed chain of information-conveying pulses is demultiplexed and routed to the respective guns of the display tube.

22 Claims, 35 Drawing Figures

INVENTORS:
EDWARD S. SMIERCIAK,
THOMAS R. BUTLER,
BY Wood, Gust, Irish & Lundy
ATTORNEYS.

INVENTORS:
EDWARD S. SMIERIAK,
THOMAS R. BUTLER,
BY Hood, Gust, Irish & Lundy
ATTORNEYS.

INVENTORS:
EDWARD S. SMIERCIAK,
THOMAS R. BUTLER,
BY Hood, Gust, Irish & Lundy
ATTORNEYS.

INVENTORS:
EDWARD S. SMIERCIAK,
THOMAS R. BUTLER,
BY Hood, Gust, Irish & Lundy
ATTORNEYS.

INVENTORS:
EDWARD S. SMIERCIAK,
THOMAS R. BUTLER,
BY Wood, Gust, Irish & Lundy
ATTORNEYS.

INVENTORS:
EDWARD S. SMIERCIAK,
THOMAS R. BUTLER,
BY Hood, Gust, Irish & Lundy
ATTORNEYS.

SEQUENTIAL DOT INTERLACED COLOR TELEVISION SYSTEM

BACKGROUND OF THE INVENTION

1. Field of the Invention

This invention relates generally to sequential dot interlaced television systems, and more particularly to a sequential dot interlaced color television system.

2. Description of the Prior Art

In conventional black and white broadcast television, 30 complete frames are transmitted each second, each frame comprising 525 lines. With each line containing on the order of 400 picture elements, each of which can have many levels of brightness, i.e., black, grays, and white, the transmission of conventional black and white broadcast television picture signals requires a transmission facility having a bandwidth of approximately 4 megacycles. However, from an information standpoint, this television picture contains much more information than the human eye can possibly assimilate. Thus, due to the limitations of the human eye, television pictures can be presented containing less information without severe picture quality degradation.

It has been proposed to reduce the bandwidth required for black and white television signal transmission by taking advantage of the psychophysical characteristics of the human eye. In accordance with such proposals, a normal line-type television presentation is divided into a series of dots or elements, a first fractional part of all of the dots in a frame being transmitted in a first frame, another fractional part in the second frame, and so forth, the number of such fractions depending upon the amount of bandwidth reduction desired. By thus transmitting these dots or elements in a sequential manner, a resulting image is generated containing sufficient information for the eye, by reason of its psychophysical characteristics, to perceive the entire picture.

Certain of the prior dot interlace systems have transmitted the dots in a predetermined sequence, such as every second, fourth, eighth, 16th, etc., dot, while others have utilized a random selection of dots for transmission in each frame. Such prior systems are described and illustrated in U.S. Pat. Nos. 2,479,880, 2,939,909 and 3,136,847, and in an article by Sid Deutsch appearing in the I. E. E. E. Transactions on Broadcasting for July 1965, pages 11 through 21.

The principle of operation of dot interlacing is essentially the same as that employed in normal television for vertical interlacing of the horizontal scanning lines, the only difference being that the interlacing now takes place in a horizontal axis rather than in the vertical axis. The requirements for horizontal dot interlacing are expressed by the equation $$f_e = f_v(LD/n_1n_2)$$

which defines the frequency of the dots or elements to be transmitted out of each line which is required for a dot interlace ratio of $n_2$. U.S. Pat. No. 3,499,980 issued Mar. 10, 1970, and assigned to the assignee of the present application discloses a sequential dot interlacing system of the type in which dots in a predetermined sequence from each line are transmitted. That application recognizes the fact that the only real requirement for dot interlacing is that the number of elements or dots in each line be the same subject to the limitation that the quotient $LD/n_1n_2$ be irreducible; it is not a requirement that the interlace frequency, i.e., the frequency of the elements or dots be a multiple of the line frequency. Thus, in the system disclosed in the aforesaid Smierciak application, a train of $D$ sampling pulses is generated in response to each line synchronizing pulse, the interval between successive line synchronizing pulses being longer than the time required to generate $D$ sampling pulses.

Application Ser. No. 658,095, filed Aug. 3, 1967, of Edward Smierciak and assigned to the assignee of the present application, discloses a multiplexed, sequential dot, interlaced black and white television system utilizing the invention of the earlier Smierciak application in multiplexing a plurality of television channels on a single transmission facility.

In conventional color television, the camera includes a plurality of separate image tubes and provides a luminance and two chrominance signals which are modulated upon the same carrier. At the receiver, the luminance and chrominance video signals are applied to separate guns in the display tube which has different colored phosphor dots on the display screen with an apertured shadow mask disposed between the display screen and the guns.

SUMMARY OF THE INVENTION

The present invention recognizes that sequential dot interlacing may be applied to the several output signals of a color television camera with the resultant signals being multiplexed thus providing a substantial reduction in the bandwidth ordinarily required for color television transmission. Thus, in accordance with the broader aspects of the invention, a sequential dot interlaced color television transmission system is provided having a color television camera with line and frame sweep input signal circuits and a plurality of signal output circuits for respectively providing time-based video signals responsive to different color components of an input optical image. Line and frame synchronizing signal sources are provided respectively coupled to the line and frame sweep signal input circuits and means are provided for transmission of video signals. Means are provided for generating a plurality of trains of recurrent sampling signals equal in number to the camera output circuits, and means are provided for coupling each of the output circuits to the transmission means in response to a different one of the trains of sampling signals thereby to pass a train of sampled video signals from the respective output circuit to the transmission means. The trains of sampling signals are respectively phase-displaced so that the sampled video signals are multiplexed in the transmission means. In the preferred embodiment, at least one of the trains of sampling signals has a frequency $f_e = f_v(LD/n_1n_2)$ where $f_v$ is the frequency of the frame synchronizing signals, $L$ is the number of lines in one frame, $D$ is a predetermined number of picture elements in one line, $n_1$ is the vertical interlace ratio, if any, and $n_2$ is a predetermined dot interlace ratio, the quotient $LD/n_1n_2$ being irreducible, there being no more camera output circuits than $n_2$.

At the receiving station, color television display apparatus is provided including a second line and frame sweep signal input circuits and a plurality of video signal input circuits equal in number to the camera output circuits. Second line and frame synchronizing sources are provided respectively coupled to the line and frame sweep signal input circuits of the display apparatus, and means are provided for synchronizing the second synchronizing signal sources with the camera synchronizing signal sources. Second means are provided for generating a plurality of trains of recurrent sampling signals equal in number to the sampling signal trains generated at the transmitting station and respectively having the same frequencies and phase displacement, and second means is provided for coupling each of the display apparatus video signal input circuits to the transmission means in response to a different one of the second trains of sampling signals thereby passing to the video signal input circuits of the display apparatus trains of sampled video signals respectively corresponding to those passed by the coupling means at the transmitting station.

It is accordingly an object of the invention to provide a sequential dot interlaced color television transmission system.

The above-mentioned and other features and objects of this invention and the manner of attaining them will become more apparent and the invention itself will be best understood by reference to the following description of an embodiment of the invention taken in conjunction with the accompanying drawings, wherein:

DESCRIPTION OF THE PREFERRED EMBODIMENTS

Figure 1:
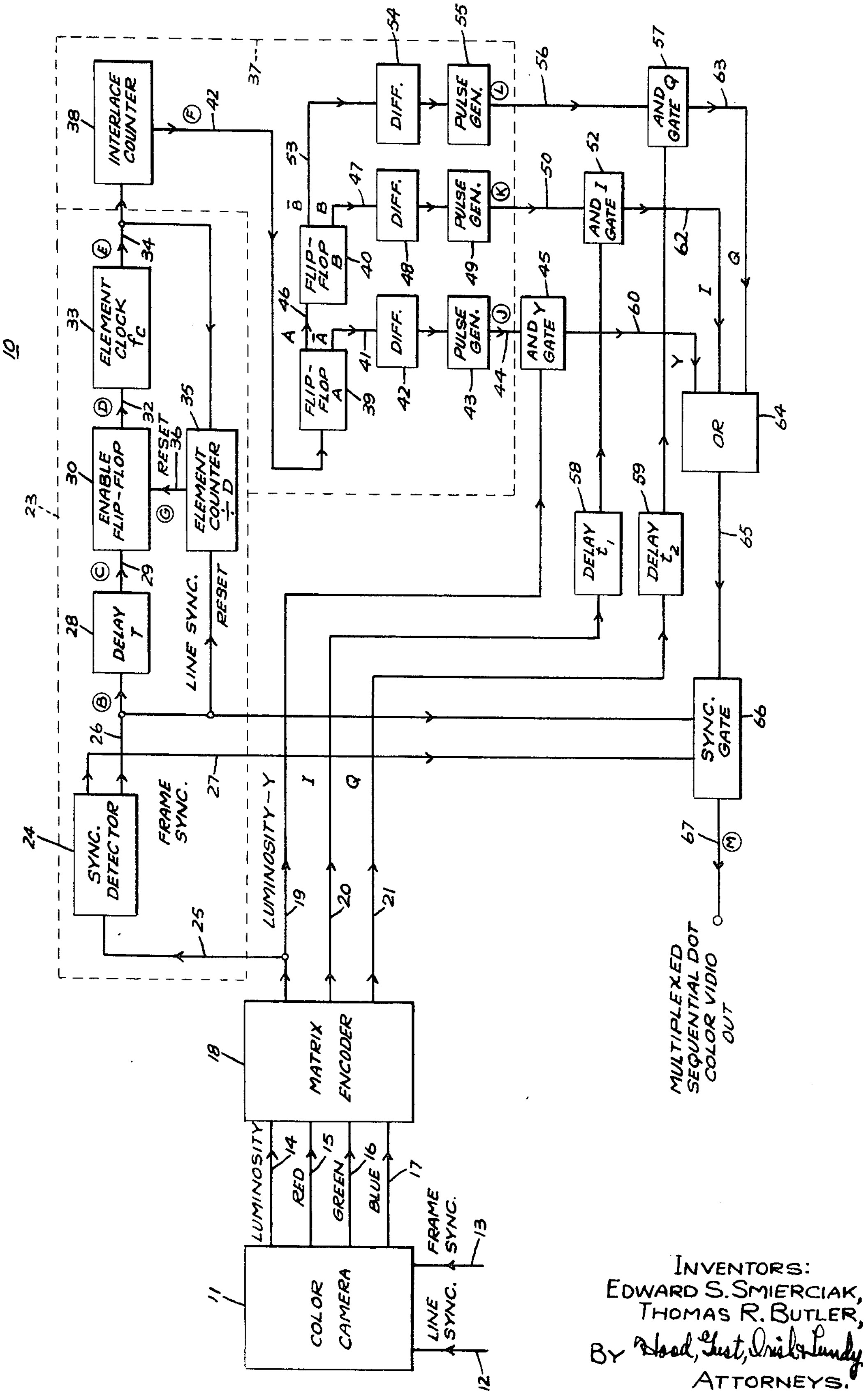
FIG. 1 is a schematic block diagram showing a transmitting station incorporating one embodiment of the sequential dot interlaced color television transmission system of the invention.

Referring now to FIG. 1, there is shown a transmitting station, generally indicated at 10, incorporating one embodiment of the sequential dot interlaced color television system of the invention. A conventional color television camera 11 is provided having conventional horizontal and vertical (line and frame) sweep circuitry with line and frame synchronizing signal sources 12 and 13 coupled thereto. Camera 11 has the conventional four video signal output circuits 14, 15, 16 and 17 for the luminosity, red, green and blue signals, respectively. Camera output circuits 14, 15, 16 and 17 are coupled to a conventional matrix encoder 18 which combines the four camera output signals in accordance with conventional practice to provide a luminosity signal Y and chrominance signals I and Q in its output circuits 19, 20 and 21.

The sequential dot interlaced control system, indicated within the dashed-line box 23, includes a conventional sync detector and separator circuit 24 having its input circuit 25 coupled to the luminosity output circuit 19 of the matrix encoder 18. It will be understood that each of the Y, I and Q video signals in output circuits 19, 20 and 21, respectively, includes line and frame synchronizing signals, and thus that input circuit 25 of sync detector and separator 24 may be coupled to any one of the output circuits 19, 20 or 21. Sync detector and separator circuit 24 has output circuit 26 for the separated line synchronizing pulses and output circuit 27 for the separated frame synchronizing pulses. It will be readily understood that if the sequential dot interlace system is located on or immediately adjacent the camera apparatus 11, the sync detector and separator circuit 24 may be eliminated and lines 26 and 27 directly coupled to the line and frame synchronizing pulse sources 12 and 13.

The line sync pulse output circuit 26 is coupled to a conventional delay circuit 28, which may be a conventional monostable multivibrator, which generates a time delay pulse in response to each detected line sync pulse, the delay pulse terminating after termination of the respective line sync pulse. Output circuit 29 of delay circuit 28 is coupled to the "set" circuit of a conventional enable flip-flop circuit 30 which generates an enabling signal in its output circuit 32. The enabling signal in output circuit 32 actuates a conventional clock pulse generator 33 which generates a train of clock pulses in its output circuit 34.

Output circuit 34 of clock pulse generator 33 is coupled to conventional pulse counting circuit 35 which counts down the clock pulses and provides a signal in its output circuit 36 in response to *D* clock pulses, *D* being the number of picture elements in one line, as will be hereinafter described. Output circuit 36 of the element counter 35 is coupled to the "reset" circuit of the enable flip-flop 30, the pulse therein responsive to *D* clock pulses terminating the enabling signal and stopping the clock pulse generator 33. The line sync pulse output circuit 26 is also coupled to the "reset" circuit of element counter 35, each line sync pulse thus resetting the element counter 35 to zero so as to initiate a new pulse count.

Interlace control circuit 23 is coupled to interlace logic circuit shown in the dashed-line box 37. Thus, output circuit 34 of element clock 33 is coupled to a bistable counting chain comprising conventional pulse counter 38 and logic flip-flops 39 and 40. Counter 38 counts down the clock pulses, continuously, providing a pulse in its output circuit 42 in response to each predetermined number of clock pulses. As will more fully described in connection with FIG. 3, in the illustrated embodiment in which the dot interlace ratio $n_2$ for the luminosity signals Y is 8:1 and the dot interlace ration $n_2$ for the chrominance signals I and Q is 16:1, counter 38 divides the clock pulses by four, i.e., providing one pulse in its output circuit 42 in response to every four clock pulses.

Flip-flop 39 has its "one" output circuit 41 coupled to a conventional differentiating circuit 42 which in turn is coupled to a conventional narrow pulse generator 43 having its output circuit 44 coupled to the gating signal input circuit of a conventional AND-gate 45. "Zero" output circuit 46 of flip-flop 39 is coupled to actuate flip-flop 40. The "one" output circuit 47 of flip-flop 40 is coupled to differentiating circuit 48 which, in turn, is coupled to narrow pulse generator 49. Output circuit 50 of pulse generator 49 is coupled to the gating signal input circuit of conventional AND-gate 52. The "zero" output circuit 53 of flip-flop 40 is coupled to conventional differentiating circuit 54 which, in turn, is coupled to narrow pulse generator 55. Output circuit 56 of pulse generator 55 is coupled to the gating signal input circuit of AND-gate 57.

The luminosity output circuit 19 (Y) and chrominance circuits 20 and 21 (I and Q) are respectively coupled to the signal input circuits of analog-type AND-gates 45, 52 and 57. For a purpose to be hereinafter described, a conventional delay circuit 58 providing a delay $t_1$ is coupled in the I output circuit 20 and another conventional delay circuit 59 providing a delay $t_2$ is coupled in the Q output circuit 21. Signal output circuits 60, 62 and 63 of AND-gates 45, 52 and 57 are coupled to a conventional summing circuit 64 which multiplexes the sequential dot interlaced Y, I and Q signals appearing in output circuits 60, 62 and 63 in its output circuit 65. The line and frame synchronizing pulses are superimposed upon the multiplexed sequential dot color video signals in output circuit 65 by a conventional gating circuit 66 having the line and frame sync pulse circuits 26 and 27 respectively coupled to its gating signal input circuits. Output circuit 67 of the sync gate 66 is adapted to be coupled to a conventional transmission facility, which may be a microwave link or a coaxial cable link.

Figures 3A, 3B, 3C, 3D, 3E, 3F, 3G:
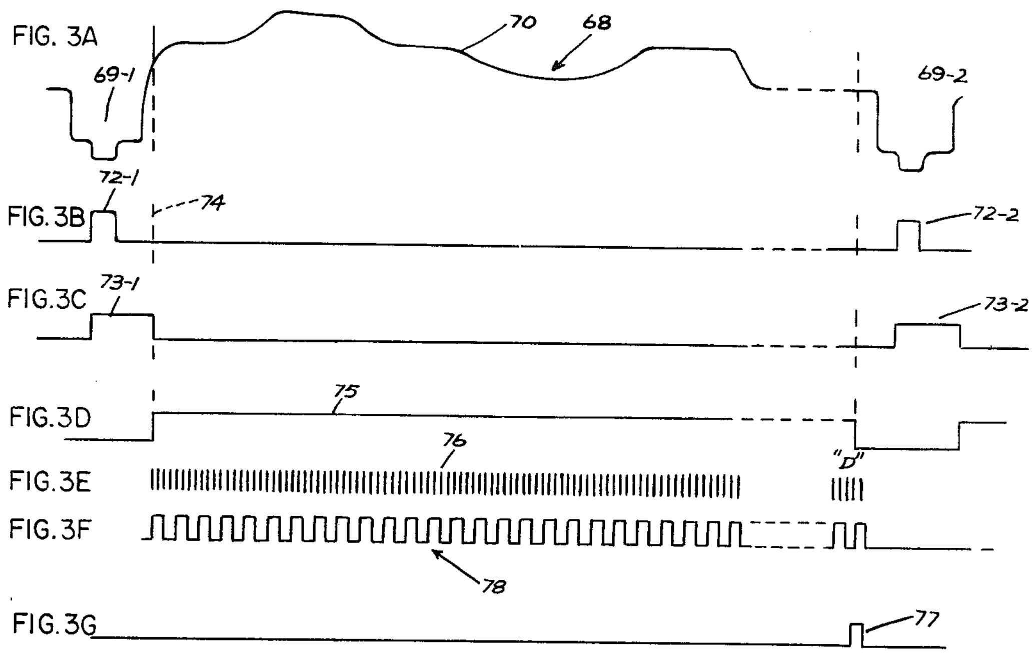
FIG. 3A–Q are timing diagrams useful in explaining the system of FIGS. 1 and 2.

Referring now to FIG. 3 in addition to FIG. 1, in FIG. 3A there is shown a typical luminosity video signal (Y) 68 appearing in output circuit 19 of the matrix encoder 18. Signal 68 has line synchronizing pulses 69–1, 69–2 with an information-conveying signal portion 70 therebetween. In FIG. 3B there are shown the detected and separated line sync pulses 72–1 and 72–2 which trigger the monostable multivibrator 28 to provide the time delay pulses 73–1, 73–2, as shown in FIG. 3C. The trailing edge 74 of the time delay pulses 73 sets the enable flip-flop 30 to initiate the enabling signal 75, as shown in FIG. 3D. It will be observed that the trailing edge 74 of the time delay pulses 73 and consequently the initiation of the enabling signal 75 and the train of clock pulses generated by the clock pulse generator 33, occurs at a time shortly after termination of the respective line sync pulse 69.

Enabling signal 75 actuates clock pulse generator 33 to generate the train of clock pulses 76 as shown in FIG. 3E. When the element counter 35 has counted down *D* clock pulses, reset signal 77 is generated which resets the enable flip-flop 30 to terminate enabling signal 75, thereby to stop the clock pulse generator 70 and to terminate the train of clock pulses. It will be observed that the frequency $f_c$ of the clock pulses generated by the clock pulse generator 33 is chosen such that $D$ clock pulses are generated during one line, the $D$th clock pulse occuring slightly prior to the occurrence of the next successive line sync pulse 69.

Figures 3H, 3I, 3J, 3K, 3L, 3M, 3N:
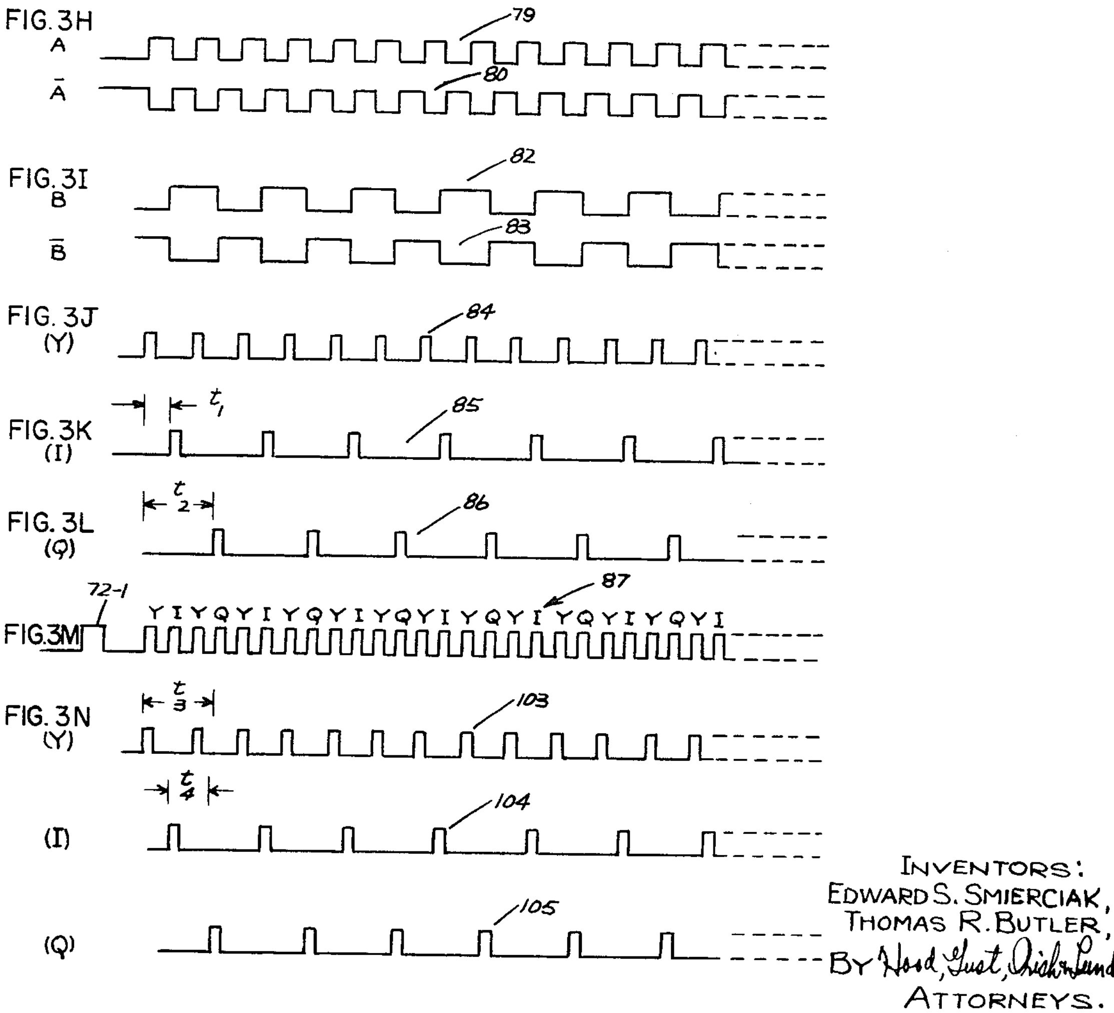
Figure 3O:
Figure 3P:
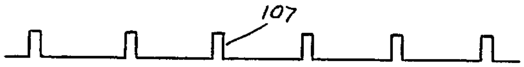
Figure 3Q:
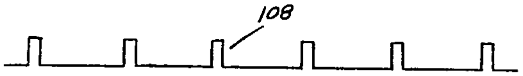

In the illustrated embodiment, the clock pulses 76 are counted down continuously by the counter 38 which provides one pulse 78 in response to every four clock pulses 76. The A flip-flop 39 divides the pulses 78 by two, providing A pulses 79 in its output circuit 41 and A pulses 80 in its output circuit 46, as shown in FIG. 3H. The A pulses 80 are applied to the B flip-flop 40 which divides these pulses by two and provides B pulses 82 in its output circuit 47 and B pulses 83 in its output circuit 53, as shown in FIG. 3I.

The leading edges of the A pulses 79 are differentiated by differentiating circuit 42 and the differentiated pulses actuate pulse generator 43 to provide gating pulses 84, as shown in FIG. 3J. It will be observed that one gating pulse 84 is generated for every eight clock pulses 76. The leading edges of the B pulses 82 are differentiated by the differentiating circuit 48, the differentiated pulses actuating pulse generator 49 to generate gating pulses 85, as shown in FIG. 3K. It will be observed that one gating pulse 85 is generated in response to every 16 clock pulses 76. Likewise, the leading edges of the B pulses 83 are differentiated by the differentiating circuit 54, the differentiated pulses actuating pulse generator 55 to generate gating pulses 86. Again it will be observed that one gating pulse 86 is generated for every 16 clock pulses 76.

It will be observed that the gating signals 84, 85 and 86 respectively actuate the AND-gates 45, 52 and 57 to pass corresponding samples of the luminosity and chrominance video signals Y, I and Q appearing in the output circuits 19, 20 and 21, the gating signals 84, 85 and 86 respectively shown in FIGS. 3J, 3K and 3L thus being representative, except for amplitude, of the sampled video signals. It will further be observed that the I and Q gating and sampling signals 85 and 86 are respectively phase-displaced from each other and from the Y gating or sampling signals 84, the I sampling signals 85 being phase-displaced from the Y sampling signals 84 by time $t_1$, and the Q sampling signals 86 being phase-displaced from the Y sampling signals 84 by time $t_2$. In order that the Y, I and Q video signals in output signals 19, 20 and 21 may be sampled at the same points in time, the I video signal in output circuit 20 is delayed by the time $t_1$ by delay circuit 58, and the Q video signal in output circuit 21 is delayed by time $t_2$ by the delay circuit 59. It will now be seen that when the sampled Y, I and Q video signals, respectively corresponding (except for amplitude) to the sampling signals 84, 85 and 86 are summed by the summing or OR-circuit 64, a train of multiplexed sampled video signals 87 is provided in output circuit 65, the line and frame sync pulses being added by the sync gate circuit 66, the line sync pulse being shown in FIG. M. It will further be observed that the train of sampled video signals 87 comprises, in sequence, a Y pulse, and an I pulse, another Y pulse, a Q pulse, another Y pulse, et seq. The luminosity video signals Y are sampled at a higher rate, with a lower interlace ratio by reason of the fact that a higher resolution is required for the luminosity signals than is required for the chrominance signals I and Q.

As discussed more fully in the aforesaid Smierciak application, the requirement for horizontal sequential dot interlacing is expressed by the equation:

$$f_e = f_v(LD/n_1n_2)$$

where $f_v$ is the frequency of the frame synchronizing signals, $L$ is the number of lines in one frame, $D$ is the number of clock pulses occurring during one line, $n_1$ is the vertical interlace ratio (if any), and $n_2$ is a predetermined dot interlace ratio, it being required that the quotient $LD/n_1n_2$ be irreducible. Thus, the frequency of the clock pulses 76 provided by the clock pulse generator 33 is expressed as:

$$f_c = f_e n_2$$

As indicated above, it is further required that $f_c$ be chosen so that $D$ clock pulses are generated during one line with the $D$th clock pulse occurring before the earliest possible occurrence of the next successive line synchronizing pulse allowing for all permissible tolerances in the line synchronizing pulse frequency. In the case of a sequential dot interlaced color television system, it is essential that the sampling signal frequency $f_e$ (Y) of the luminosity video signals Y respond to the above equation. By virtue of the lower resolution requirement for the color signals, it is not essential but still desirable that the sampling signal frequency $f_e$ (I) and $f_e$ (Q) for the chrominance signals I and Q likewise respond to the above equation. Finally, although not essential, it is also desirable that the frequency $f_e$ (M) of the multiplexed sampling signals respond to the above equation. It is thus seen that in the illustrated embodiment, sequential dot interlace ratios of 8:1 for the Y sampling signals, 16:1 for the I and Q sampling signals, and 4:1 for the multiplexed signals completely satisfy the equation for horizontal sequential dot interlacing, since they are derived from the same clock.

Figure 2:
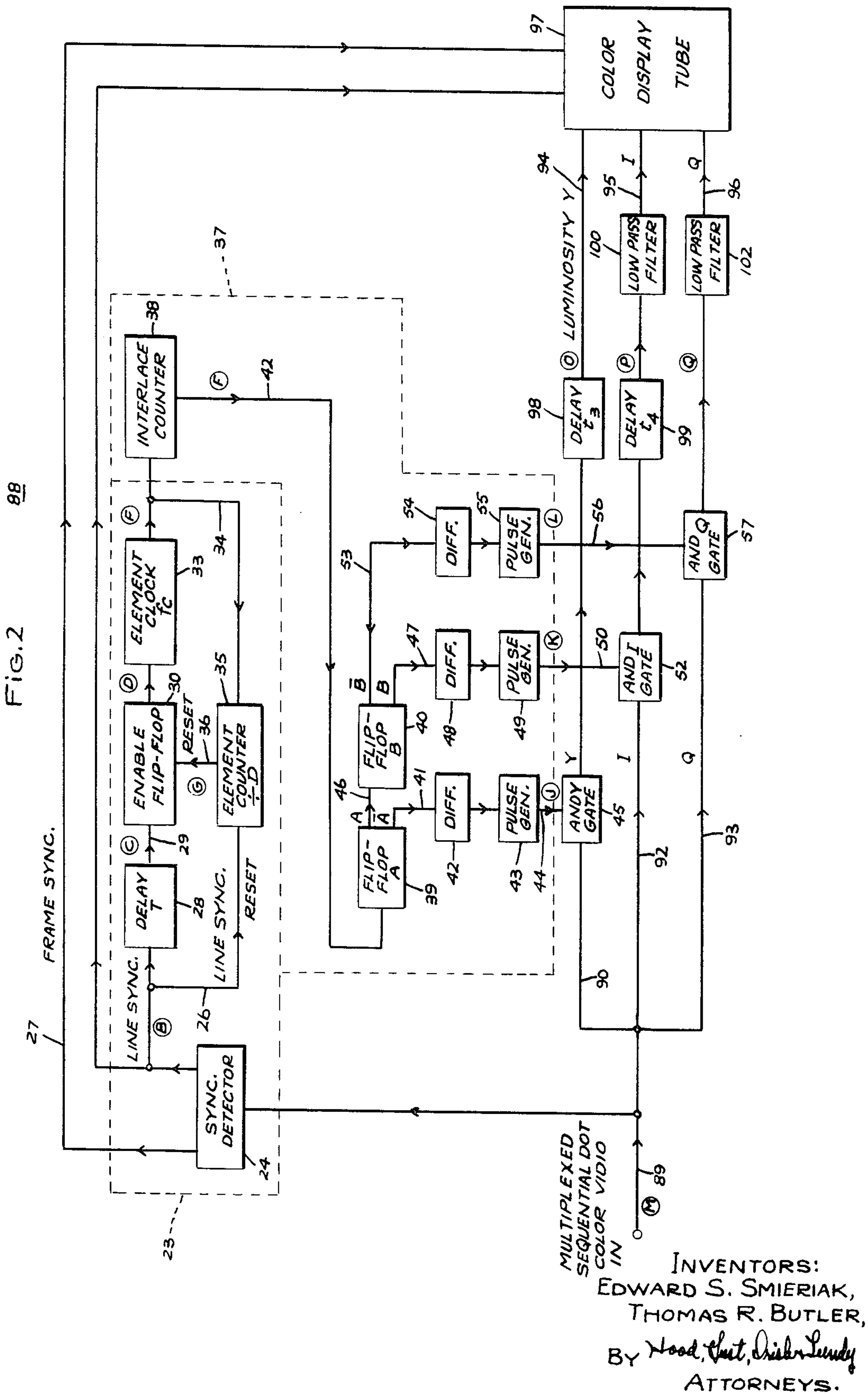
FIG. 2 is a schematic block diagram illustrating one embodiment of a receiving station for use with the transmitting station system of FIG. 1.

Referring now to FIG. 2, in which like elements are indicated by like reference numerals, there is shown a receiving station, generally indicated at 88, for use with the transmitting station shown in FIG. 1. Here, input circuit 89 is adapted to be connected to the receiving end of the transmission facility, and thus receives the multiplexed sequential dot signals as shown in FIG. 3M. A sequential dot interlace control circuit 23 and logic circuit 37 identical to that shown in FIG. 1 and described above is provided. More particularly, input circuit 89 is coupled to sync detector and separator circuit 24 having line and frame sync pulse output circuits 26 and 27. Line sync pulse output circuit 26 is coupled to delay circuit 28 having its output circuit 29 coupled to the enable flip-flop 30. Output circuit 32 of the enable flip-flop 30 is coupled to the element clock 33 which has its output circuit coupled to the element counter 35 and the interlace counter 38. Output circuit 36 of the element counter 35 is coupled to the "reset" circuit of enable flip-flop 30 and line sync pulse output circuit 26 is coupled to the "reset" circuit of the element counter 35.

Output circuit 42 of the interlace counter 38 is coupled to the A flip-flop 39 which has its A output circuit 46 coupled to the B flip-flop 40. The A output circuit 41 of flip-flop 39 is coupled to differentiating circuit 42 which, in turn, is coupled to actuate narrow pulse generator 43. Output circuit 44 of pulse generator 43 is coupled to the gating signal input circuit of the Y AND-gate 45. The B output circuit 47 of flip-flop 40 is coupled to differentiating circuit 48 which is coupled to actuate narrow pulse generator 49. Output circuit 50 of pulse generator 49 is coupled to the gating signal input circuit of the I AND-gate 52. The B output circuit 53 of flip-flop 40 is coupled to differentiating circuit 54 which is coupled to actuate narrow pulse generator 55. Output circuit 56 of pulse generator 55 is coupled to the gating signal input circuit of the Q AND-gate 57.

The multiplexed sequential dot signals 87 appearing in input circuit 89 are applied to three input circuits 90, 92 and 93 respectively coupled to the signal input circuits of the Y, I and Q AND-gates 45, 52 and 57. The Y, I and Q output circuits of the AND-gates 45, 52 and 57 are respectively coupled to the Y, I and Q video signal input circuits 94, 95 and 96 of the conventional color television display tube 97. In order to compensate for the delays $t_1$ and $t_2$ provided by the delay circuits 58 and 59 in the chrominance output circuits 20 and 21 of the transmitting station, a conventional delay circuit 98 providing a delay $t_3$ is provided in the luminosity (Y) video signal input circuit 94, and a conventional delay circuit 99 providing a delay of $t_4$ is provided in the chrominance (I) video signal input circuit 95. Conventional low pass filter circuits 100, 102 are provided in the chrominance video signal input circuits (I and Q) 95 and 96 in order to smooth out the pulsed chrominance signals.

Referring now again to FIG. 3, the sampling gate pulses respectively applied to the AND-gates 45, 52 and 57 are shown in FIG. 3N. It will be observed that the Y sampling signals 103 will pass the Y multiplexed signals to the Y video signal input circuit 94, that the I sampling signals 104 will pass the I multiplexed signals to the I video signal input circuit 95, and that the Q sampling signals 105 will pass the Q multiplexed signals to the Q video signal input circuit 96, the sequential dot interlace control circuit 23 and logic circuit 37 thus serving to demultiplex the transmitted sequential dot color information.

It will be recalled that the delay circuits 58 and 59 respectively delayed the chrominance video signals I and Q by times $t_1$ and $t_2$, respectively, in order to compensate for the phase displacement of the I and Q sampling signal trains 85 and 86 with respect to the Y sampling signal train 84. It is desirable that the corresponding Y, I and Q signals 103, 104 and 105 be applied in phase to the display tube 97. It will be observed that delay of the Y sampling signals 103 at the receiving station by time $t_3$ would bring every other Y sampling signal pulse in phase with a respective Q sampling signal pulse 105, and likewise that delay of the I sampling signal pulses 104 by time $t_4$ will bring the I sampling signal pulses 104 in phase with the Q sampling signal pulses 105. These respective delays are provided by the delay circuits 98 and 99 to provide the in-phase relationship of the Y, I and Q video signals, as shown at 106, 107 and 108 in FIGS. 3O, P and Q.

Figure 4:
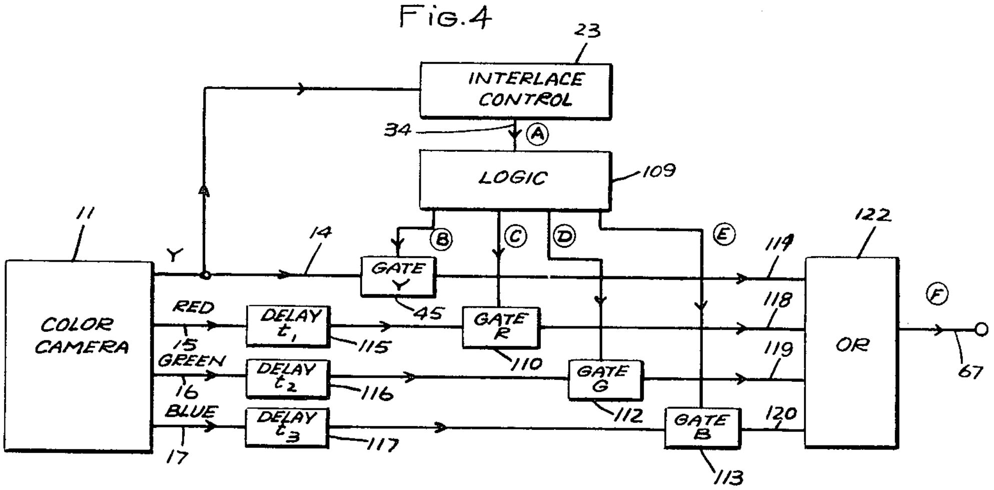
FIG. 4 is a schematic block diagram illustrating another embodiment of a transmitting station incorporating the invention.
Figure 5:
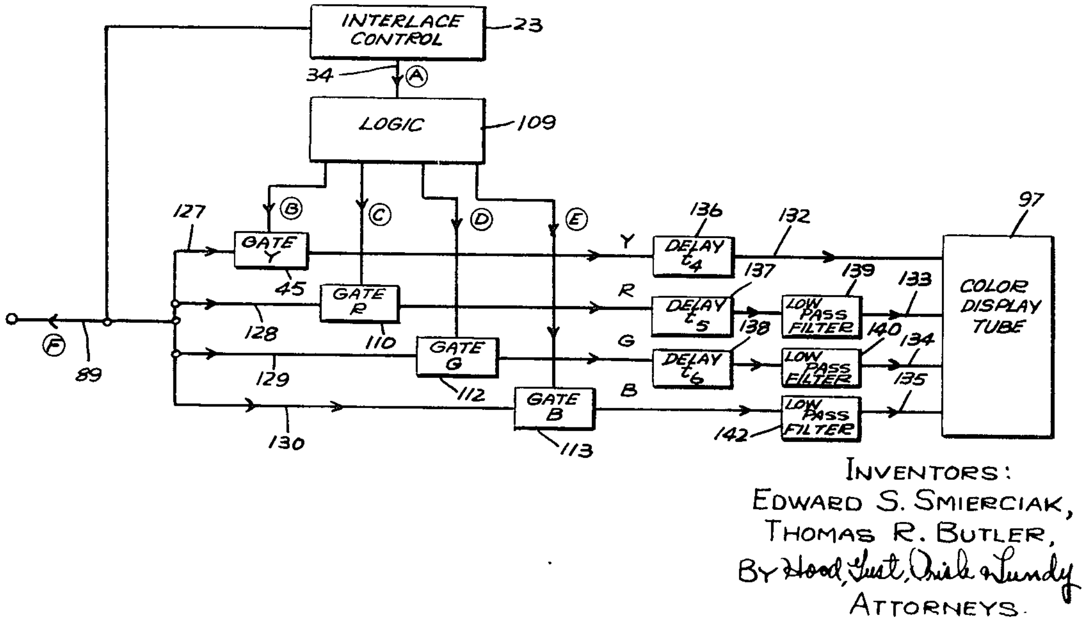
FIG. 5 is a schematic block diagram showing a receiving station for use with the transmitting station of FIG. 4.

Referring now to FIGS. 4 and 5 in which like elements are indicated by like reference numerals, it is not necessary for satisfactory sequential dot interlacing of color television signals that the four output video signals of a conventional color television camera, i.e., the luminosity, red, green and blue signals be encoded to provide the luminosity signal Y and the two chrominance signals I and Q; each of the four output video signals from the color television camera may be individually sequentially dot interlaced and the resultant sampled signals multiplexed. Thus, as shown in FIG. 4, the sequential dot interlace control unit 23 may again be coupled to the luminosity output circuit 14 to receive the line and frame synchronizing pulses. Output circuit 34 of the interlace control circuit 23 is coupled to logic circuit 109 which may be similar to the logic circuit 37 of the previous embodiment, but which will now provide four trains of phase-displaced sampling signals respectively applied to AND-gates 45, 110, 112 and 113. The luminosity signal Y is in output circuit 14 is applied to the Y sampling gate 45 and the resultant sampled video signal appears in output circuit 114. Conventional delay circuits 115, 116 and 117 are coupled in the red, green and blue output circuits 15, 16 and 17 and respectively delay the video signals therein by times $t_1$, $t_2$, $t_3$ corresponding to the phase displacement of the sampling signals respectively applied to gates 110, 112 and 113 with respect to the sampling signals applied to the gate 45. The thus-delayed red, green and blue signals are applied to the signal input circuits of the red, green and blue sampling gates 110, 112 and 113, and the resultant sampled video signals appear in output circuits 118, 119 and 120. The phase-displaced trains of sampled video signals in output circuits 114, 118, 119 and 120 are applied to summing circuit 122 which thus multiplexes the sampled video signals in output circuit 67 which is adapted to be connected to the transmission facility.

Figures 6A, 6B, 6C, 6D, 6E, 6F:
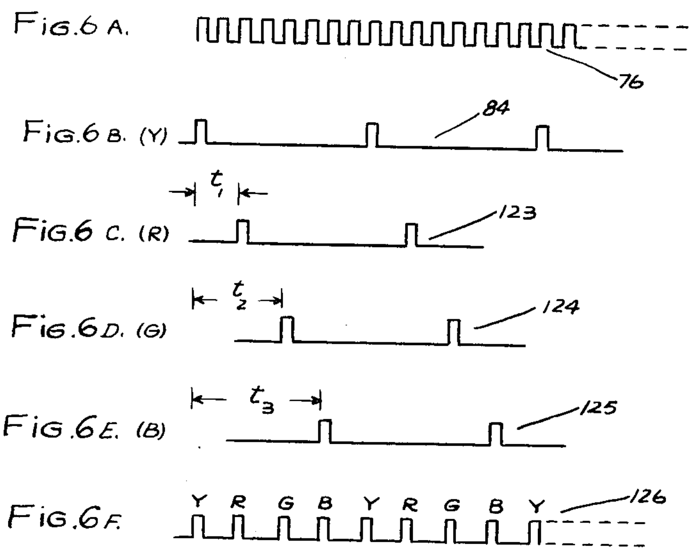
FIG. 6A–F are timing diagrams useful in explaining the mode of operation of the system of FIGS. 4 and 5.

Referring now additionally to FIG. 6, FIG. 6A shows the train 76 of clock pulses provided by the clock pulse generator 33. The train 84 of luminance of Y sampling pulses in shown in FIG. 6B, the Y sampling pulses 84 in the illustrated embodiment having a dot interlace ratio of 8:1. The trains of red, green and blue sampling signals 123, 124 and 125 are respectively shown in FIGS. 6C, D and E. In this embodiment, the red green and blue sampling signals 123, 124 and 125 likewise have a dot interlace ratio ($n_2$) of 8:1. It will be seen that the train of red sampling signals 123 is phase displaced from the train 84 of Y sampling signals by $t_1$, that the train of green sampling signals 124 is phase displaced by time $t_2$, and that the train of blue sampling signals 125 is phase displaced by time $t_3$, these being the respective time delays of the red, green and blue video signals provided by the delay circuits 115, 116 and 117. The multiplexing of the trains of sampled video signals provided by the sampling signals 84, 123, 124 and 125 is shown at 126 in FIG. 6F. Here, it will be seen that the train of multiplexed signals comprises Y, R, G and B pulses in sequence, the sequential dot interlace ratio of the multiplexed signals being 2:1.

Referring now to FIG. 5, at the receiving station for use with the transmitting station system of FIG. 4, input circuit 89 which receives the train of multiplexed signals 126 is again coupled to the interlace control circuit 23, and is also coupled to four input circuits 127, 128, 129 and 130. Output circuit 34 of the interlace control circuit 23 is again coupled to logic circuit 109 which applies the four trains of phase-displaced samplings signals 84, 123, 124 and 125 to the gating signal input circuits of gates 45, 110, 112 and 113 which have their signal input circuits respectively coupled to circuits 127, 128, 129 and 130. The gate circuits 45, 110, 112 and 113 are respectively coupled to the luminosity, red, green and blue video signal input circuits 132, 133, 134 and 135 of the color television display tube 97. In this embodiment, delay circuits 136, 137 an 138 respectively providing delays of $t_4$, $t_5$ and $t_6$ are respectively coupled in the luminosity, red and green video signal input circuits 132, 133 and 134 for respectively delaying the luminosity, red and green sampled signal trains with respect to the blue sampled signal train in video signal input circuit 135 to reestablish the in-phase relationship, as described above in connection with FIGS. 2 and 3. Again, conventional low pass filter circuits 139, 140 and 142 are provided coupled in the red, green and blue video signal input circuit 133, 134 and 135 for smoothing out the red, green and blue signal pulses.

Figure 7:
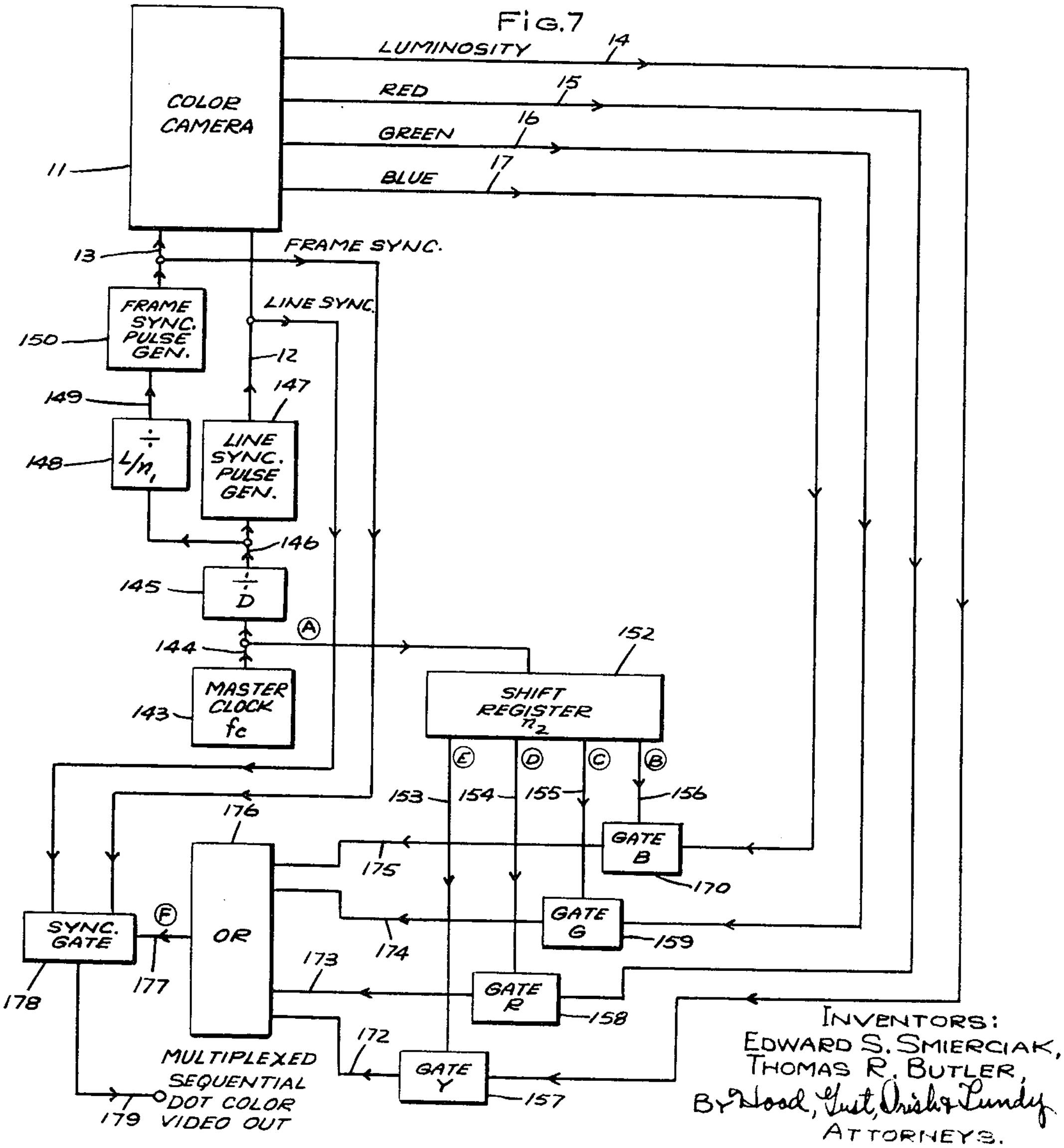
FIG. 7 is a schematic block diagram illustrating a transmitting station incorporating yet another embodiment of the invention.

Referring now to FIG. 7, in which like elements are still indicated by like reference numerals, here a master clock pulse generator 143 generates clock pulses of frequency $f_c$ and has its output circuit 144 coupled to a dividing circuit 145 which divides the clock pulses frequency $f_c$ by $D$ to provide line synchronizing pulses in its output circuit 146. Output circuit 146 is coupled to a conventional line synchronizing pulse generator 147 coupled to the line sync input circuit 12 of the color television camera 11. Output circuit 146 of dividing circuit 145 is coupled to another conventional dividing circuit 148 which divides the line synchronizing pulses by $L/n_1$ to provide frame synchronizing pulses in its output circuit 149. Output circuit 149 is coupled to conventional frame synchronizing pulse generator 150 which is coupled to frame sync input circuit 13 of camera 11. The master clock pulse generator 143 has its output circuit 144 coupled to the input circuit of a conventional shift register 152 which sequentially applies the clock pulses to its output circuits 153, 154, 155 and 156. Output circuits 153, 154, 155 and 156 of the shift register 152 are respectively applied to the luminosity, red, green and blue sampling gate circuits 157, 158, 159 and 170. The luminosity red, green and blue video signal output circuits 14, 15, 16 and 17 of the camera 11 are respectively coupled to the signal input circuits of gates 157, 158, 159 and 170, the output circuits 172, 173, 174 and 175 of the gates being respectively applied to summing circuit 176. The multiplexed output circuit 177 of summing circuit 176 is applied to the signal input circuit of the sync gate 178 which has its output circuit 179 adapted to be connected to the transmission facility. The line and frame sync circuits 12 and 13 are respectively applied to the gating signal input circuits of the sync gate 178.

Figures 9A, 9B, 9C, 9D, 9E, 9F:
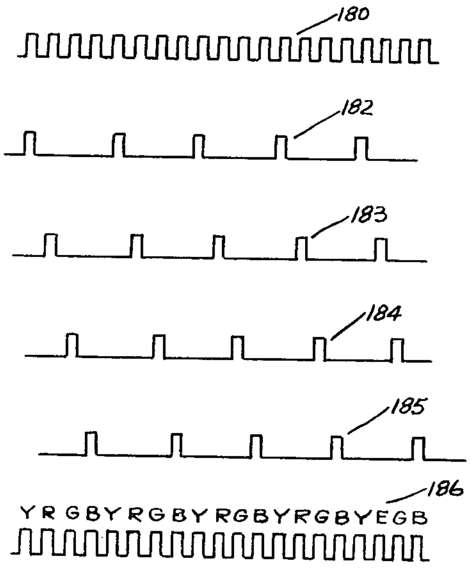
FIG. 9A–F are timing diagrams useful in explaining the mode of operation of the system of FIGS. 7 and 8.

Referring now additionally to FIG. 9, the train of clock pulses provided by the master clock pulse generator 143 is shown at 180 in FIG. 9A. Reference to FIGS. 9B, C, D and E will show that the shift register 152 respectively provides trains 182, 183, 184 and 185 of phase-displaced luminosity, red, green and blue sampling signals, each of the trains of sampling signals having a sequential dot interlace ratio $n_2$ of 4:1. The train of multiplexed sampled video signals appearing in output circuit 177 of the summing circuit 176 is shown in FIG. 9F, being observed that the train comprises luminance, red, green and blue sampled video signals in repetitive sequence.

Figure 8:
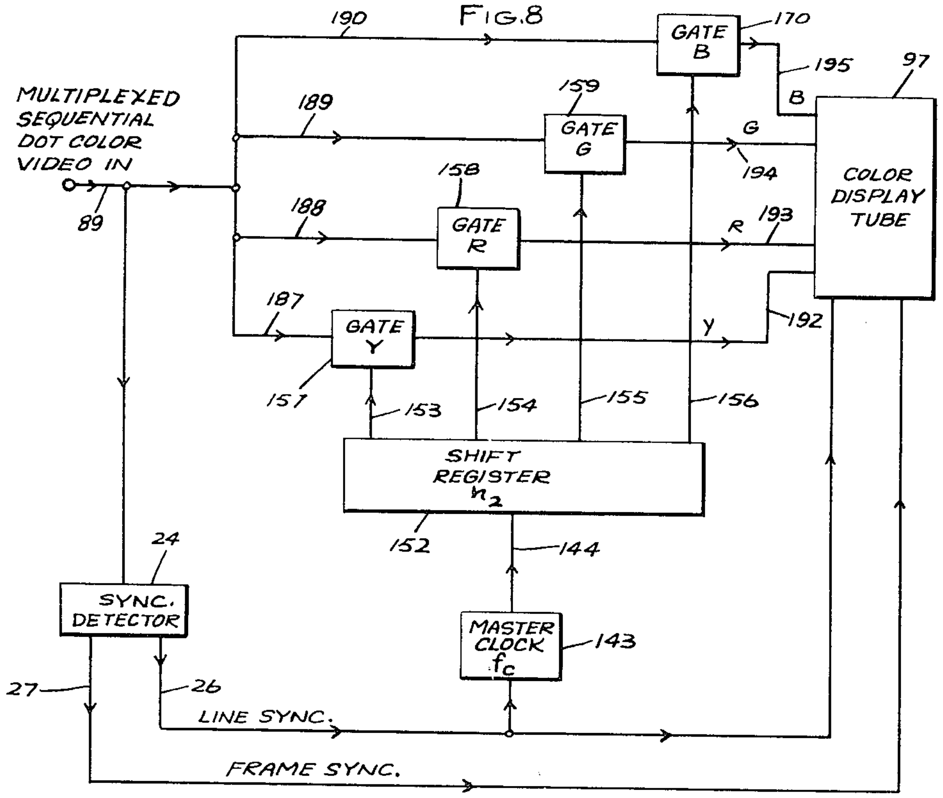
FIG. 8 is a schematic block diagram of a receiving station for use with the transmitting station of FIG. 7.

Referring now to FIG. 8 in which like elements are still indicated by like reference numerals, in the receiving system illustrated for use with the transmitting system of FIG. 7, input circuit 89 which again receives from the transmission facility the train of multiplexed video signals 186, is again coupled to sync detector and separator circuit 24 which separates the line and frame synchronizing pulses in line and frame sync pulse output circuits 26 and 27. Master clock 143 is coupled to the line sync pulse output circuit 26 and synchronized thereby. Input circuit 89 is coupled to input circuits 187, 188, 189 and 190. Output circuit 144 of the master clock generator 143 is coupled to shift register 152 which has its output circuits 153, 154, 155 and 156 respectively coupled to the gating signal input circuits of the luminance, red, green and blue sampling gates 157, 158, 159 and 170. Sampling gates 157, 158, 159 and 170 respectively couple input circuits 187, 188, 189, and 190 to the luminance, red, green and blue video signal input circuits 192, 193, 194 and 195 of the color television display tube 97.

Referring again to the system of FIGS. 1, 2 and 3, it will be seen that the multiplexed sampled video signal which is transmitted and received has a dot interlace ratio of 4:1 thus permitting use of a transmission facility having one megacycle transmission bandwidth as opposed to 4 megacycles as in the case of conventional broadcast color television. However, since the signal transmitted consists of a train of pulses, it will be readily apparent that the multiplexed sampled video signals may be digitally encoded for further bandwidth reduction. As indicated, the delays provided in the systems of FIGS. 1, 2, 4 and 5 are employed so as properly to phase the chrominance or color information with the luminosity information. However, while such delays are desirable, the red, green and blue or chrominance information is very low in resolution with respect to the information and thus, the delays may be eliminated, as shown in the system of FIGS. 7 and 8, without serious degradation of the displayed picture. Further, the low pass filters employed in the systems of FIGS. 2 and 5, serve to create continuous rather than a discrete type of chrominance signal which is modulated with the dot interlace luminosity information. Elimination of the filters in the color or chrominance channels, as shown in the system of FIG. 8, results in each picture element in a given television frame being only one color which tends to present a more pastel appearance when the resulting picture is viewed by the naked eye. However, if the display at the receiver is exposed to color photographic film, the resulting photograph would appear normal due to the additive effects of the color components.

While there have been described above the principles of this invention in connection with specific apparatus, it is to be clearly understood that this description is made only by way of example and not as a limitation to the scope of the invention.

What is claimed is:

1. A sequential dot interlaced raster-type color television transmission system comprising: means including a color television camera having line and frame sweep signal input circuits and a plurality of signal output circuits for respectively providing time-based video signals responsive to different color components of an input optical image; line and frame synchronizing signal sources respectively coupled to said line and frame sweep signal input circuits; means for transmission of video signals; means controlled by said line synchronizing signal for generating a plurality of trains of recurrent sampling signal pulses for respective said output circuits; counting means providing each of said plurality of trains of sampling signal pulses with a corresponding train having a smaller number of pulses in a predetermined ratio; a plurality of gating means for combining each of said trains of smaller pulse numbers and respective said output circuit video signals and for phase displacing respective said trains of smaller pulse numbers and combined video signals; and means for coupling said combined phase-displaced video signal pulse trains and said line and frame synchronizing signals to said transmission means whereby sampled video signals are multiplexed in said transmission means.

2. The system of claim 1 wherein at least one of said sampling signal trains has a frequency $f_e=f_v(LD/n_{12})$ where $f_v$ is the frequency of said frame synchronizing signals, $L$ is the number of lines in one frame, $D$ is a predetermined number of picture elements in one line, $n_1$ is the vertical interlace ratio, and $n_2$ is a predetermined dot interlace ratio, the quotient $LD/n_1n_2$ being irreducible, there being no more output circuits than $n_2$.

3. The system of claim 2 further comprising a source of recurrent timing signals having a frequency $f_c=f_en_2$, said generating means being coupled to said timing signal source and actuated thereby, $f_c$ being such that there are $D$ timing signals provided during one line, $f_c$ being an integral multiple of the frequencies of each of said trains of sampling signals, and said generating means including means for phase displacing said trains of sampling signals by an integral multiple of the period of $f_c$.

4. The system of claim 3 wherein each of said trains of timing signals has a frequency $f_e=f_v(LD/n_{12})$ with the quotient $LD/n_1n_2$ being irreducible.

5. The system of claim 2 wherein one of said output circuits provides a luminance video signal, the other of said output circuits respectively providing video signals responsive to different colors; said coupling means coupling said one output circuit to said transmission means in response to said one timing signal train.

6. The system of claim 1 further comprising means in each of said output circuits with the exception of one for respectively delaying the video signals therein by times corresponding to the phase displacement of the respective timing signal trains with respect to the timing signal train which couples said one output circuit to said transmission means.

7. The system of claim 5 further comprising means in each of said other output circuits for respectively delaying the video signals therein by times corresponding to the phase displacement of the respective timing signal trains with respect to said one train.

8. The system of claim 7 wherein there are three of said other output circuits respectively providing video signals responsive to red, green and blue colors.

9. The system of claim 7 wherein there are two of said other output circuits respectively providing chrominance video signals.

10. The system of claim 7 wherein the frequency of said one timing signal train is an integral multiple greater than one of the frequencies of the other timing signal trains, said other timing signal trains having the same frequency.

11. The system of claim 1 wherein said gating means includes a plurality of selectively actuable sampling gates respectively coupled to said output circuits, each of said sampling gates having a gating signal input circuit, means for respectively applying said trains of sampling signals to said sampling gate input circuits, and means coupling said sampling gates to said transmission means for summing the sampled video signals passed thereby.

12. The system of claim 1 further comprising means for displaying a color television image including second line and frame sweep signal input circuits and a plurality of video signal input circuits equal in number to said output circuits, means for receiving said combined phase-displaced video signal pulses from said transmission means, second line and frame synchronizing signal sources coupled to said second line and frame sweep signal input circuits, means for synchronizing said second synchronizing signal sources with said first-named synchronizing signal sources; second means controlled by said second line synchronizing signal for generating a second plurality of trains of recurrent sampling signal pulses equal in number to said first-named sampling signal trains and respectively having the same frequencies, second counting means providing each of said second plurality of trains of sampling signal pulses with a corresponding train having a smaller number of pulses in said predetermined ratio, a second plurality of gating means for combining each of said second trains of smaller pulse numbers with said phase-displaced video signal pulses from said transmission means, means for phase displacing respective said second smaller pulse trains an amount equal and opposite to respective phase displacements of said video signal pulses from said transmission means; and means for coupling respective phase-displaced second smaller pulse trains and video signal pulses from said transmission means to each of said display means video signal input circuits thereby passing to said video signal input circuits trains of sampled video signals respectively corresponding to those passed by said first-named coupling means.

13. The system of claim 12 wherein at least one of said first-named sampling signal trains has a frequency $f_e = f_v(LD/n_{12})$ where $f_v$ is the frequency of said frame synchronizing signals, $L$ is the number of lines in one frame, $D$ is a predetermined number of picture elements in one line, $n_1$ is the vertical interlace ratio, and $n_2$ is a predetermined dot interlace ratio, the quotient $LD/n_1 n_2$ being irreducible, there being no more output circuits than $n_2$.

14. The system of claim 13 further comprising a first source of recurrent timing signals having a frequency $f_c = f_e n_2$, said first-named generating means being coupled to said first timing signal source and actuated thereby, $f_c$ being such that there are $D$ timing signals provided during one line, $f_c$ being an integral multiple of the frequencies of each of said first-named trains of sampling signals, said first-named generating means including means for phase displacing said first-named trains of sampling signals by an integral multiple of the period of $f_c$, a second source of recurrent timing signals having a frequency $f_c$, said second generating means being coupled to said second timing signal source and actuated thereby and including means for providing said phase displacement of said second timing signal trains.

15. The system of claim 14 whereby said second timing signal source is coupled to said second synchronizing signal source and thereby maintained in synchronism with said first timing signal source.

16. The system of claim 12 further comprising means in each of said output circuits with the exception of one for respectively delaying the video signals therein by times corresponding to the phase displacement of the respective first-named timing signal trains with respect to the timing signal train which couples said one output circuit to said transmission means, and means in each of said video signal input circuits with the exception of one for respectively delaying the signals therein by times such that corresponding video signals in each of said video signal input circuits are in phase.

17. The system of claim 13 wherein one of said output circuits provides a luminance video signal, the other of said output circuits respectively providing video signals responsive to different colors, said first-named coupling means coupling said one output circuit to said transmission means in response to said one of said first-named signal trains, one of said video signal input circuits being for luminance video signals and the other of said video signal input circuits being for said different color video signals.

18. The system of claim 17 further comprising means in each of said other output circuits for respectively delaying the video signals therein by times corresponding to the phase displacement of the respective first-named timing signal trains with respect to said one first-named signal trains, and means in said one video signal input circuit and in each of said other video signal input circuits with the exception of one for respectively delaying the signals therein by times such that the corresponding video signals in each of said video signal input circuits are in phase.

19. The system of claim 17 further comprising a low bandpass filter in each of said other video signal input circuits.

20. The system of claim 18 further comprising a low bandpass filter in each of said other video signal input circuits.

21. The system of claim 3 further comprising means for actuating said timing signal source thereby to initiate a train of timing signals in response to each said line synchronizing signal, and means for terminating each said timing signal train in response to $D\ n_2$ timing signals, $f_c$ being such that each interval between successive line synchronizing signals is longer than $D\ n_2$ timing signals.

22. The system of claim 14 further comprising means coupling said first-named line synchronizing signal source to said first timing signal source for initiating a train of said first-named timing signals in response to each said first-named line synchronizing signal, means for terminating each said train of first-named timing signals in response to $D\ n_2$ timing signals, $f_c$ being such that each interval between successive line synchronizing signals is longer than $D\ n_2$ timing signals, means coupling said second line synchronizing signal source to said second timing signal source for initiating a train of said second timing signals, and means for terminating each said train of second timing signals in response to $D$ second timing signals.

* * * * *